Figure 1:

United States Patent [19]

Haas

[11] Patent Number: 4,606,389
[45] Date of Patent: Aug. 19, 1986

[54] FRONT WHEEL TIRE TREAD FOR A MOTORCYCLE

[75] Inventor: Johann Haas, Munich, Fed. Rep. of Germany

[73] Assignee: Metzeler Kautschuk GmbH, Munich, Fed. Rep. of Germany

[21] Appl. No.: 680,758

[22] Filed: Dec. 12, 1984

[30] Foreign Application Priority Data

Dec. 12, 1983 [DE] Fed. Rep. of Germany ... 8335597[U]

[51] Int. Cl.$^4$ ............................................ B60C 11/08
[52] U.S. Cl. .................................. 152/209 R; D12/147
[58] Field of Search .................... 152/209 R, 209 D; D12/140, 147, 136, 146, 151

[56] References Cited

U.S. PATENT DOCUMENTS 2,642,914 6/1953 Palko et al. ..................... 152/209 R
3,730,245 5/1973 Kusunoki et al. ............... 152/209 R

FOREIGN PATENT DOCUMENTS 0064934 11/1982 European Pat. Off. ........ 152/209 D
197808 8/1978 Fed. Rep. of Germany ... 152/209 D Primary Examiner—Michael Ball
Attorney, Agent, or Firm—Herbert L. Lerner; Laurence A. Greenberg

[57] ABSTRACT

A front wheel tire for a motorcycle includes a support structure and a profiled running surface disposed on the support structure, the running surface having grooves formed therein in the form of a central groove extending in circumferential direction, and mutually parallel transverse grooves emanating from the central groove, the grooves defining blocks therebetween having parallelogrammatic cross sections and being disposed symmetrical to and laterally of the central groove, the blocks and the transverse grooves being inclined in the shape of an arrow at an angle of substantially between 60° and 85° to the central groove in traction direction of the tire.

1 Claim, 2 Drawing Figures

U.S. Patent   Aug. 19, 1986   4,606,389 ical: 4,606,389

FRONT WHEEL TIRE TREAD FOR A MOTORCYCLE

The invention relates to a front wheel tire for a motorcycle, including a support structure and a profiled running surface, the running surface having a central groove extending in circumferential direction, blocks disposed symmetrical to and laterally of the central groove, and transverse grooves between the blocks.

Conventional profiles in the running surfaces of motorcycle tires have the disadvantage of permitting puddles on the road to cause skidding due to the water. This dangerous effect is known as so-called "aquaplaning". Furthermore, the road stability of these tires also requires improvement.

It is accordingly an object of the invention to provide a front wheel tire for a motorcycle which overcomes the hereinafore-mentioned disadvantages of the heretofore-known tires of this general type, and which especially has better properties with respect to road stability and the danger of aquaplaning With the foregoing and other objects in view there is provided, in accordance with the invention, a front wheel tire for a motorcycle, comprising a support structure and a profiled running surface disposed on the support structure, the running surface having grooves formed therein in the form of a central groove extending in circumferential direction, and mutually parallel transverse grooves emanating from the central groove, the grooves defining blocks therebetween surrounded by the transverse grooves having parallelogrammatic cross sections and being disposed symmetrical to and laterally of the central groove, the blocks and the transverse grooves being inclined in the shape of an arrow with the central groove at an angle of substantially between 60°0 and 85° to the central groove in traction direction of the tire.

In accordance with another feature of the invention, there are provided side walls, at least some of the blocks extending to the side walls.

In accordance with a further feature of the invention, there are provided further blocks extended in circumferential direction to the central groove, the transverse grooves including pairs of grooves extended from the central groove to the side walls, each pair of grooves having two of the blocks inclined in the shape of an arrow extended approximately in radial direction and one of the further circumferentially extended blocks parallel to the central groove, disposed therebetween.

In accordance with an added feature of the invention, the further blocks between adjacent pairs of grooves are alternately disposed at the central groove and at the side walls.

In accordance with an additional feature of the invention, the grooves include relatively short grooves extending in circumferential direction each being disposed within a respective pair of the transverse grooves separating the approximately radially extending blocks from the circumferentially extending block.

In accordance with a concomitant feature of the invention, the grooves include relatively short transverse grooves extended toward the central groove in the shape of an arrow, each being disposed within a respective pair of the first-mentioned transverse grooves separating the two blocks extended approximately in radial direction from each other.

The advantages obtained by practicing the invention are based on the features that the inclined, approximately parallelogrammatic or parallelogram-shaped blocks reach out from the central groove far into the side walls, and are separated from each other by corresponding transverse grooves, which are disposed in the shape of an arrow. This slight inclining of the profile blocks provides uniform rolling action of the tire with a correspondingly uniform distribution of the road pressure. At high speeds this results in outstanding straight forward rolling with optimal road or drive stability.

The stability around curves is also improved, because the profile is loaded by lateral forces, which are transferred with little displacement by the blocks that are rigid with respect to shearing forces, and therefore provide a feeling of stability.

Since the transverse grooves extend from the central groove up into the side walls, a very favorable behavior on wet surfaces results, and the danger of aquaplaning is very low by comparison with the prior art. As the tire goes through a puddle, the water is displaced toward the outside through the central and transverse grooves, so that the directly outwardly leading straight "flow channels" prevent the dangerous surface floating of the tire.

The above-mentioned uniform distribution of the road pressure leads to a reduction of the specific road pressure, and therefore yields an advantage with respect to the ability of the tire to cling to the road. Furthermore, this also results in longer life of the tire, since the wear of front tires is mostly caused by slippage during the rolling action of the tire, so-called "form-slippage" (Formschlups). Due to the above-described profile, this slippage is greatly reduced, so that the wear is correspondingly reduced and a longer tire life is obtained.

Other features which are considered as characteristic for the invention are set forth in the appended claim.

Although the invention is illustrated and described herein as embodied in a front wheel tire for a motorcycle, it is nevertheless not intended to be limited to the details shown, since various modifications and structural changes may be made therein without departing from the spirit of the invention and within the scope and range of equivalents of the claim.

Figure 2:
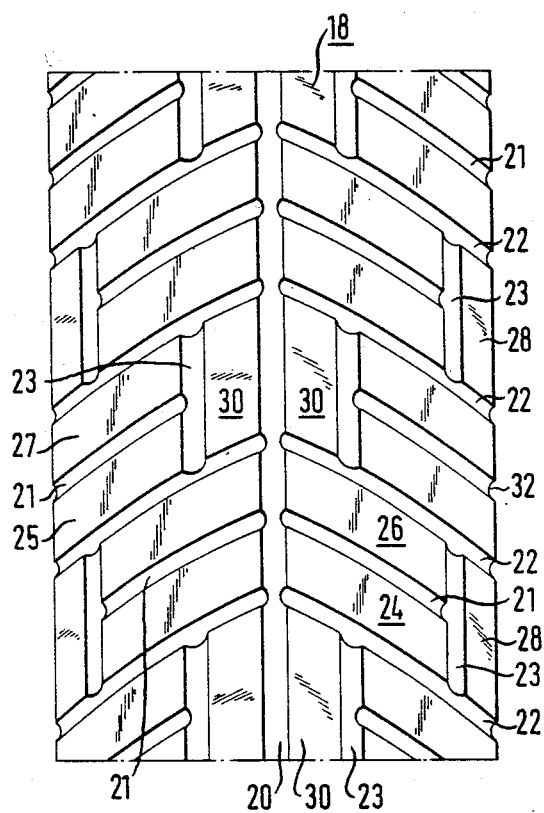

The construction and method of operation of the invention, however, together with additional objects and advantages thereof will be best understood from the following description of specific embodiments when read in connection with the accompanying drawings, in which:

FIG. 1 is a diagrammatic perspective view of a front wheel of a motorcycle with a rim and a pneumatic tire; and FIG. 2 is a top plan view of the profile of the front wheel tire.

Referring now to the figures of the drawing in detail and first particularly to FIG. 1 thereof, there is seen a front wheel of a motorcycle which is designated with reference symbol 10 and which has a conventional rim 12, a pneumatic tire 14 with a foundation or support structure 16 that is not illustrated further, and a profiled running surface 18.

As is shown in FIG. 2, the running surface 18 has a profile which is symmetrical to a central groove 20, that extends around the tire in the direction of the circumference of the running surface, as a mid-circumferential plane.

Symmetrical transverse grooves 22 which extend to the side walls of the pneumatic tire 14, and short transverse grooves 21, originate from this central groove 20. The transverse grooves 21, 22 are inclined in an arrow shape in the direction of the traction of the tire. For example, according to FIG. 1, the running surface 18 of the tire moves toward the top in the plane of the drawing.

Approximately parallelogrammatic blocks 24, 25, 26, 27, 28, 30 are disposed between the transverse grooves 27, 22. Three blocks are always disposed between the two transverse grooves 22, according to the pattern shown in FIG. 2, and two typical pattern configurations are alternately formed as shown. In the first pattern configuration, starting from the central groove 20, two inclined parallelogrammatic blocks 24, 26 extend diagonally outward toward the tread edge. These two blocks 24, 26 are parallel to each other, and are closed off from the outside by an additional parallelogrammatic block 28, which extends in the circumferential direction. The two parallel blocks 24, 26, which run approximately in the radial direction, are separated from each other by a short transverse groove 21, and are separated from the block 28, which extends in the circumferential direction, by a short longitudinal groove 23.

In the second pattern configuration which follows the first, a single parallelogrammatic block 30 extends in the circumferential direction, symmectrical to the central groove 20, and two blocks 25, 27 which are parallel to each other, extend radially outwardly to the side wall of the tire Similar to the first pattern configuration, these blocks are also separated from each other by a short longitudinal groove 23.

The inclined blocks 24, 26 and 25, 27, which run approximately in the radial direction, have the same cross-section or surface area; this also applies for the blocks 28, 30 which extend in the circumferential direction. The dimensions of the blocks are proportional to each other, so that the blocks 28, 30 which lie in the circumferential direction have a length which corresponds to the total width of two radially extending blocks 24, 26 or 25, 27, including the associated transverse groove 32.

The foregoing is a description corresponding in substance to German Application No. G 83 35 597.9, filed Dec. 12, 1983, the International priority of which is being claimed for the instant application, and which is hereby made part of this application. Any material discrepancies between the foregoing specification and the aforementioned corresponding German application are to be resolved in favor of the latter.

I claim:

1. Front wheel tire for motorcycles, comprising a tread pattern including a tread edge, a circumferential central groove, relatively long mutually parallel transverse grooves, emanating diagonally from said central groove to the tread edge, said transverse grooves extending in the shape of an arrow in the direction of traction subtending an angle of substantially between 60° and 85° to said central groove, relatively short circumferential grooves each extending parallel to said central groove between two respective transverse grooves, and first and second groups of parallelogrammatic blocks enclosed by said circumferential and transverse grooves and alternatingly disposed at opposite sides of said central groove, each block having two edges extending in circumferential direction, each first group including a block extending in circumferential directin and two mutually parallel blocks extending diagonally outward between said circumferential block and the tread edge, and each second group including two blocks extending diagonally outward from said central groove and one block extending in circumferential direction parallel to the tread edge between said two blocks of said second group and said tread edge.

* * * * *